US012152408B2

(12) United States Patent
Woodley et al.

(10) Patent No.: US 12,152,408 B2
(45) Date of Patent: Nov. 26, 2024

(54) LOCK/UNLOCK INDICATOR

(71) Applicant: DORMAKABA USA INC., Indianapolis, IN (US)

(72) Inventors: Jamison D. Woodley, Indianapolis, IN (US); Yang Wei, Shenzhen (CN)

(73) Assignee: dormakaba USA Inc, Indianapolis, IN (US)

(*) Notice: Subject to any disclaimer, the term of this patent is extended or adjusted under 35 U.S.C. 154(b) by 502 days.

(21) Appl. No.: 16/912,551

(22) Filed: Jun. 25, 2020

(65) Prior Publication Data

US 2020/0408002 A1 Dec. 31, 2020

Related U.S. Application Data

(63) Continuation-in-part of application No. 29/696,700, filed on Jun. 29, 2019, now Pat. No. Des. 966,866.

(60) Provisional application No. 62/868,889, filed on Jun. 29, 2019.

(51) Int. Cl.

*E05B 41/00* (2006.01)
*E05B 15/02* (2006.01)
*E05B 17/20* (2006.01)

(52) U.S. Cl.

CPC .............. *E05B 41/00* (2013.01); *E05B 15/02* (2013.01); *E05B 17/20* (2013.01)

(58) Field of Classification Search

CPC .......... E05B 41/00; E05B 15/02; E05B 17/20; E05B 17/2007; E05B 17/203; E05B 17/2034; E05B 17/10; E05B 17/106; E05B 13/00; E05B 13/002; E05B 65/10; E05B 65/1006; E05B 65/1046; E05B 65/1053; E05B 65/108; E05B 39/00; Y10T 292/57; Y10T 292/0908; Y10T 292/0909; Y10T 292/091; Y10S 70/59

See application file for complete search history.

(56) References Cited

U.S. PATENT DOCUMENTS

| | | | | |
|---|---|---|---|---|
| D353,532 | S | 12/1994 | Miller | |
| 6,938,445 | B2 * | 9/2005 | Huang | E05B 41/00 70/432 |
| D628,587 | S | 12/2010 | Vandeberghe et al. | |
| D683,755 | S | 6/2013 | Phelan | |
| D685,249 | S | 7/2013 | Friedli | |

(Continued)

FOREIGN PATENT DOCUMENTS

| | | | |
|---|---|---|---|
| CN | 107109864 | A | 8/2017 |
| CN | 304918272 | S | 11/2018 |

(Continued)

OTHER PUBLICATIONS

Product brochure for Best 9K Series Intruder Function lock, dormakaba Holding, (BA-0045), bestaccess.com (Year: 2017).*

(Continued)

*Primary Examiner* — Christine M Mills
*Assistant Examiner* — Noah Horowitz
(74) *Attorney, Agent, or Firm* — Faegre Drinker Biddle & Reath LLP

(57) ABSTRACT

A visual indicator of lock status is disclosed. An operation indicator signaling to an operator a lock operator input direction and an unlock operator input direction to signal to the operator operations that will lock and unlock the locking device is also disclosed.

14 Claims, 17 Drawing Sheets

(56) References Cited

U.S. PATENT DOCUMENTS

| | | | |
|---|---|---|---|
| D718,113 | S | 11/2014 | Di Nicola Ciaranca |
| D738,913 | S | 9/2015 | Cabrera-Cordon et al. |
| 9,169,669 | B2 * | 10/2015 | Clary ...................... E05B 41/00 |
| 9,187,928 | B2 * | 11/2015 | Abel ....................... E05B 17/10 |
| 9,273,495 | B2 | 3/2016 | Tien |
| 9,435,141 | B2 | 9/2016 | Tien |
| 9,569,066 | B2 | 2/2017 | Van et al. |
| D794,676 | S | 8/2017 | Daniel |
| D803,872 | S | 11/2017 | Cole |
| 9,879,445 | B2 * | 1/2018 | Gopalakrishnan .......................... E05B 27/0003 |
| 9,945,158 | B2 * | 4/2018 | Lehner, Jr. .......... E05B 65/1093 |
| D819,690 | S | 6/2018 | Choi et al. |
| D826,983 | S | 8/2018 | Hamaguchi et al. |
| D826,984 | S | 8/2018 | Gatts et al. |
| D840,434 | S | 2/2019 | Haverstock et al. |
| D851,126 | S | 6/2019 | Tauban |
| D851,127 | S | 6/2019 | Tauban |
| D888,762 | S | 6/2020 | Butcher et al. |
| D894,229 | S | 8/2020 | Hoofard et al. |
| D904,424 | S | 12/2020 | Hansen et al. |
| D909,175 | S | 2/2021 | Wu |
| 10,920,466 | B2 * | 2/2021 | Long ..................... B64C 1/1407 |
| D912,089 | S | 3/2021 | Ocando et al. |
| D966,866 | S | 10/2022 | Woodley et al. |
| 2004/0187533 | A1 | 9/2004 | Huang |
| 2005/0081164 | A1 | 4/2005 | Hama et al. |
| 2011/0016938 | A1 * | 1/2011 | Chi ..................... E05B 65/0035 70/432 |
| 2013/0150128 | A1 | 6/2013 | Tsunoda |
| 2014/0245798 | A1 | 9/2014 | Beckman |
| 2015/0167354 | A1 | 6/2015 | Tien |
| 2015/0225982 | A1 * | 8/2015 | Bronner .............. E05B 63/0017 70/432 |
| 2015/0252592 | A1 * | 9/2015 | Tien ........................ E05B 65/10 70/92 |
| 2015/0315816 | A1 * | 11/2015 | Gopalakrishnan ...... E05B 63/06 70/344 |
| 2016/0115720 | A1 | 4/2016 | Wong et al. |
| 2017/0342740 | A1 | 11/2017 | Basavaraju et al. |
| 2018/0066450 | A1 | 3/2018 | Voelker |
| 2019/0234110 | A1 | 8/2019 | Laporta |
| 2019/0323264 | A1 | 10/2019 | Lunday |
| 2019/0368226 | A1 * | 12/2019 | Sweeney ................. E05B 41/00 |
| 2020/0109578 | A1 | 4/2020 | Lunday et al. |
| 2020/0157856 | A1 | 5/2020 | Kim et al. |
| 2022/0003020 | A1 | 1/2022 | Clifford |

FOREIGN PATENT DOCUMENTS

| | | | |
|---|---|---|---|
| CN | 110036167 | A | 7/2019 |
| CN | 305354798 | S | 9/2019 |
| CN | 210049705 | U | 2/2020 |
| CN | 305806969 | S | 5/2020 |
| CN | 305848401 | S | 6/2020 |
| CN | 306116534 | S | 10/2020 |
| DE | 202004009405 | U1 | 8/2004 |
| TW | 201040371 | A | 11/2010 |
| TW | M432689 | U | 7/2012 |
| WO | 2010/107468 | A1 | 9/2010 |

OTHER PUBLICATIONS

Product brochure for Best 9K Series Intruder Function lock, bestaccess.com, 2017.

Anikia, Depositphoto, Date first available Sep. 6, 2019 [online]retrieved Jul. 14, 2021, available from, https://depositphotos.com/303391448/stock-illustration-sign-open-close-and-a.html (Year: 2019).

Beacon, Classroom Door Security, Date first available from wayback date Jun. 4, 2018, [online]retrieved May 11, 2021, available from wayback https://web.archive.Org/web/20180930130925/http://www.beaconcdl.com/classroom-door-security/ (Year: 2018).

Probrico Store, Electronic Keypad Deadbolt, Date first available Jun. 18, 2020, [online]retrieved Jun. 24, 2021, available from https://www.amazon.com/Probrico-Electronic-Deadbolt-Camelot-Cylinder/dp/B08BFL66F3/ref=sr_1_17?dchild=1&keywords=Locke y+Digital+Door+Lock+M220+Surface+Mount+Deadbolt&qid=1614803709& (Year: 2020).

Redtron, Child Proof Safety Locks, Date first available Apr. 21, 2019, [online]retrieved Feb. 16, 2021, available from https://www.amazon.ca/Upgraded-Adjustable-Adhesive-Cabinets-Drilling/dp/B07R1RBDM4/ref=pd_day0_11?pd_rd_w=tShLC&pf_rd_p=a0f07c06-3bfe-427e-9527-5be8cea27b66&pf_rd_r=3PYT4GPHETW74Q63WFCD& (Year: 2019).

Wassers, Child Safety Oven Door Lock, Date first available Dec. 3, 2019, [online]retrieved Feb. 16, 2021, available from https://www.amazon.ca/Child-Safety-Oven-Door-Sticker-Universal/dp/B081PML3JK/ref=sr_1_245?dchild=1&keywords=Magnetic+Child+Lock&qid=1613508430&sr=8-245 (Year: 2019).

* cited by examiner

LOCK/UNLOCK INDICATOR

CROSS-REFERENCE TO RELATED APPLICATIONS

This application claims the benefit of U.S. Provisional Application No. 62/868,889, filed Jun. 29, 2019, titled LOCK/UNLOCK INDICATOR, and is a continuation-in-part of U.S. Design patent application No. 29/696,700, filed Jun. 29, 2019, titled LOCK/UNLOCK INDICATOR, the entire disclosures of both of U.S. Provisional Application No. 62/868,889 and U.S. Design patent application No. 29/696,700 are expressly incorporated by reference herein.

FIELD

The present disclosure relates to locking devices and, in particular, to door locks having a visual indicator of lock/unlock status and/or a visual indicator signaling how to operate the lock.

BACKGROUND

Locking devices are used in a variety of implementations to limit access to a space. For example, door locks can be used to limit one or both of ingress and egress through a door. In certain instances “exit doors” are employed. Exit doors never limit egress, but can have a locked condition that limits ingress. In a number of situations it is helpful to supply a visual indicator indicating the lock/unlock status of a lock. For example, a visual indicator on an exit door will signal to an occupant of the space enclosed by the exit door that ingress into the space currently is prohibited to those not having an appropriate key (physical or virtual).

SUMMARY

In certain exemplary embodiments thereof, the present disclosure provides a visual indicator of lock status. In certain exemplary embodiments thereof, the present disclosure provides an operation indicator signaling to an operator a lock operator input direction and an unlock operator input direction to signal to the operator operations that will lock and unlock the locking device.

The disclosure, in one form thereof, provides a locking assembly, including: a latch; a latch actuator selectively actuatable by a user to actuate the latch; and a lock core. The lock core including: a tailpiece; and an input operable to selectively actuate the tailpiece. This form of the disclosure further includes a lock moveable between a lock position and an unlock position, in the lock position the lock blocking actuation of the latch by the latch actuator, in the unlock position the lock allowing actuation of the latch by the latch actuator, the tailpiece of the lock core positioned to actuate the lock between the lock position and the unlock position; and a visible indicator moveable between a first position visibly indicating the lock position of the lock and a second position visibly indicating the unlock position of the lock, the visible indicator positioned relative to the lock such that movement of the lock between the lock position and the unlock position translates into movement of the visible indicator between the first position and the second position, the visible indicator spaced from the tailpiece such that movement of the tailpiece without movement of the lock will not translate into movement of the visible indicator.

The disclosure, in another form thereof, provides a locking assembly, comprising: a latch; a latch actuator selectively actuatable by a user to actuate the latch; and a lock core. The lock core including: a tailpiece; and an input operable to selectively actuate the tailpiece, a longitudinal axis of the lock core intersecting the tailpiece at a first end of the lock core and the longitudinal axis of the lock core intersecting the input at a second end of the lock core. This form of the disclosure further includes: a lock moveable between a lock position and an unlock position, the lock comprising a locking arm, in the lock position the locking arm blocking actuation of the latch by the latch actuator, in the unlock position the locking arm allowing actuation of the latch by the latch actuator, the tailpiece of the lock core positioned to actuate the lock between the lock position and the unlock position; and a visible indicator moveable between a first position visibly indicating the lock position of the lock and a second position visibly indicating the unlock position of the lock, the visible indicator positioned relative to the lock such that movement of the lock between the lock position and the unlock position translates into movement of the visible indicator between the first position and the second position, the tailpiece positioned intermediate the locking arm and the visible indicator along the longitudinal axis of the lock core.

The disclosure, in yet another form thereof, provides a locking assembly, comprising: a latch; a latch actuator selectively actuatable by a user to actuate the latch; and a lock core. The lock core including: a tailpiece; and an input operable to selectively actuate the tailpiece, a longitudinal axis of the lock core intersecting the tailpiece at a first end of the lock core and the longitudinal axis of the lock core intersecting the input at a second end of the lock core. This form of the disclosure further includes: a lock moveable between a lock position and an unlock position, in the lock position the lock blocking actuation of the latch by the latch actuator, in the unlock position the lock allowing actuation of the latch by the latch actuator, the tailpiece of the lock core positioned to actuate the lock between the lock position and the unlock position; and a visible indicator moveable between a first position visibly indicating the lock position of the lock and an second position visibly indicating the unlock position of the lock, the visible indicator positioned relative to the lock such that movement of the lock between the lock position and the unlock position translates into movement of the visible indicator between the first position and the second position, the visible indicator positioned along the longitudinal axis of the lock core between the tailpiece and the input, whereby the visible indicator does not extend along the longitudinal axis of the lock core beyond the tailpiece of the lock core.

In alternatives of the above described forms of the disclosure, the visible indicator comprises: a cuff positioned circumferentially about an exterior of the lock core; and a flag carrier extending from the cuff, the flag carrier having a lock visible indicator and an unlock visible indicator.

In further alternatives of the above described forms of the disclosure, the locking assembly further includes: a lock detent positioned to retain the lock in the lock position; and an unlock detent positioned to retain the lock in the unlock position.

In further yet alternatives of the above described forms of the disclosure, the visible indicator comprises: a cuff positioned about an exterior of the lock core; an indicator arm extending from the cuff; and a flag carrier connected to the indicator arm and spaced from the cuff, the flag carrier having a lock visible indicator and an unlock visible indicator.

In further alternatives of the above described forms of the disclosure implementing a flag carrier, the flag carrier is pivotally connected to the indicator arm and the locking assembly further includes: a guide guiding linear movement of the flag carrier between the first position visibly indicating the lock position of the lock and the second position visibly indicating the unlock position of the lock, whereby rotational movement of the cuff is translated into linear movement of the flag carrier.

In further still alternatives of the above described forms of the disclosure, the locking assembly further includes: an escutcheon having a window, the lock visible indicator visible through the window when the visible indicator maintains the first position to visibly indicate the lock position of the lock, the unlock visible indicator visible through the window when the visible indicator maintains the second position to visibly indicate the unlock position of the lock.

In further alternatives of the above described forms of the disclosure, the lock includes: a locking arm pivotable about a pivot axis spaced from an axis of rotation of the tailpiece, the tailpiece of the lock core positioned to selectively pivot the locking arm between the lock position and the unlock position; and the visible indicator includes: a cuff positioned about an exterior of the lock core; and a flag carrier extending from the cuff, the flag carrier having a lock visible indicator and an unlock visible indicator; the lock further comprising a visible indicator actuator, the visible indicator actuator positioned and sized to actuate the visible indicator between the first position and the second position when the locking arm is pivoted about the pivot axis, the tailpiece positioned intermediate the locking arm and the visible indicator along a longitudinal axis of the lock core, the longitudinal axis of the lock core intersecting the tailpiece at a first end of the lock core and the longitudinal axis of the lock core intersecting the input at a second end of the lock core, the visible indicator actuator spanning the locking arm and the visible indicator.

In further alternatives of the above described forms of the disclosure, the visible indicator actuator is positioned to receive a rotary motion from the tailpiece and transmit the rotary motion to the lock to pivot the locking arm about the pivot axis to selectively pivot the locking arm between the lock position and the unlock position.

In further alternatives of the above described forms of the disclosure, the locking assembly further includes: an escutcheon having an operation indicator signaling to an operator a lock operator input direction for operating the input of the lock core to place the lock in the lock position and the operator also signaling to the operator an unlock operator input direction for operating the input of the lock core to place the lock in the unlock position, the operation indicator comprising: a debossed area, the debossed area comprising a lock debossed area and an unlock debossed area, the lock debossed area filled with a first colored fill visually indicating a lock condition, the unlock debossed area filled with a second colored fill visually indicating an unlock condition. In further alternative embodiments, the first colored fill and the second colored fill both comprise an enamel paint, the locking assembly further comprising a clear coat coating an outer surface of the escutcheon, the first colored fill and the second colored fill.

The disclosure, in a further alternative thereof, provides a method of visually indicating one of a locked condition and an unlocked condition of a locking assembly, the locking assembly comprising: a latch; a latch actuator selectively actuatable by a user to actuate the latch; a lock core, including: a tailpiece; and an input operable to selectively actuate the tailpiece; a lock moveable between a lock position and an unlock position, in the lock position the lock blocking actuation of the latch by the latch actuator, in the unlock position the lock allowing actuation of the latch by the latch actuator, the tailpiece of the lock core positioned to actuate the lock between the lock position and the unlock position, the tailpiece transmitting motion from the input of the lock core through the tailpiece to the lock in a motion transfer stream, the tailpiece downstream from the input in the motion transfer stream, the lock downstream from the tailpiece in the motion transfer stream, the method including the steps of: actuating a visible indicator downstream from the lock in the motion transfer stream, the visible indicator moveable between a first position visibly indicating the lock position of the lock and a second position visibly indicating the unlock position of the lock.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
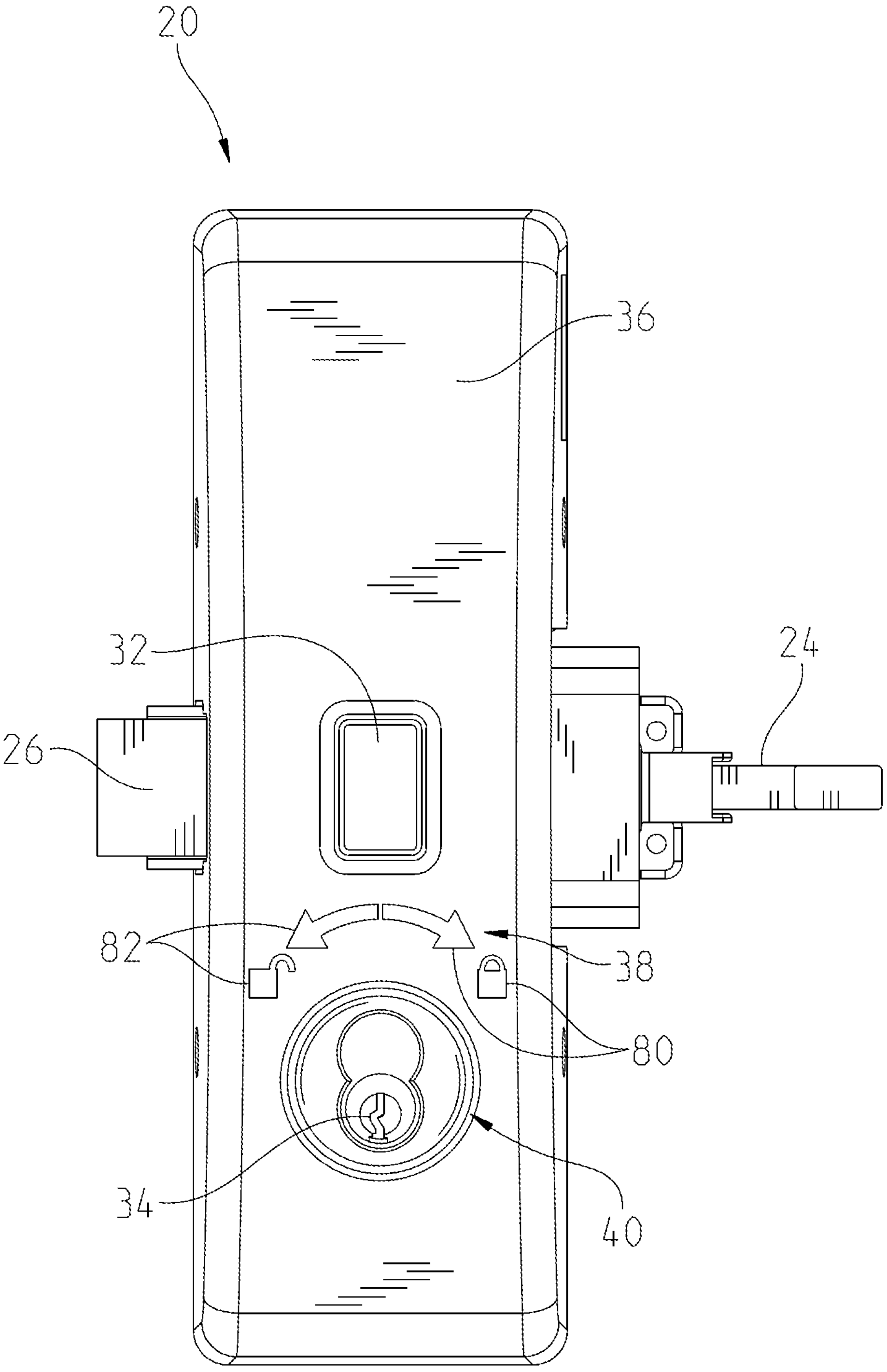
FIG. 1 is a front view of a locking device.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
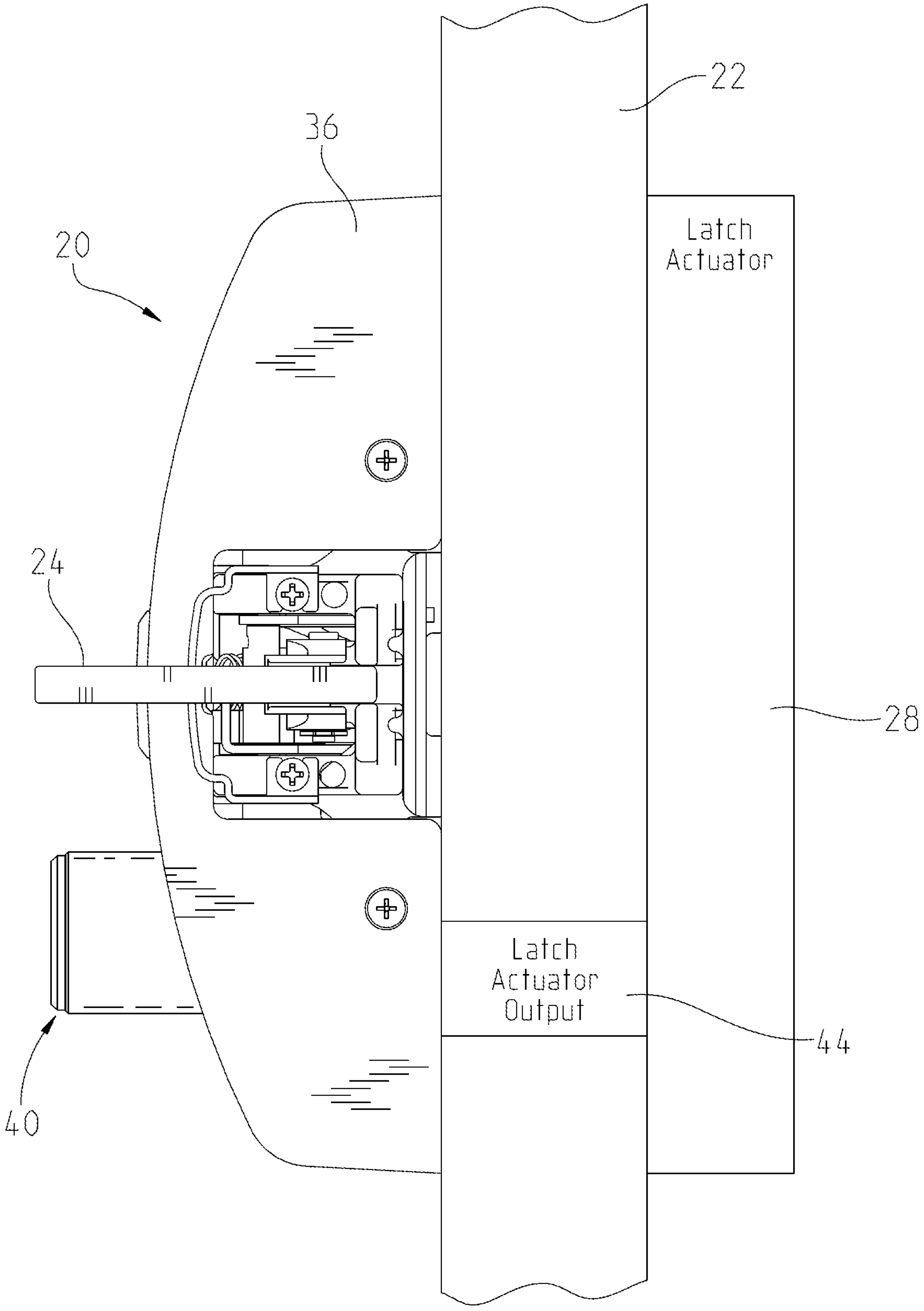
FIG. 2 is a side elevational view of the locking device of FIG. 1, shown together, schematically, with an exit door and an exterior latch actuator.

Referring to FIG. 1, locking device 20 is illustrated. Locking device 20 illustrated in the exemplary embodiments of the present disclosure is meant for use with exit door 22 (FIG. 2). Locking device 20 includes egress handle 24 which is always operable (i.e., cannot be locked) to actuate latch 26 and allow egress through exit door 22. Referring to FIG. 2, exit door 22 has exterior latch actuator 28 connected thereto. Exterior latch actuator 28 is selectively operable through latch actuator output 44 to actuate latch 26 to allow ingress through exit door 22. Numerous conventional mechanisms may be utilized to transmit input motion received by latch actuators such as egress handle 24 and exterior latch actuator 28 into actuation of a latch such as latch 26. In the simplest arrangement, a latch actuator may rotate a cam which pulls latch 26 out of engagement with the barrier against which latch 26 presses to provide locking. Exterior latch actuator 28 may take numerous forms, including, e.g., a handle, a thumb turn, or a knob.

Figure 1A:
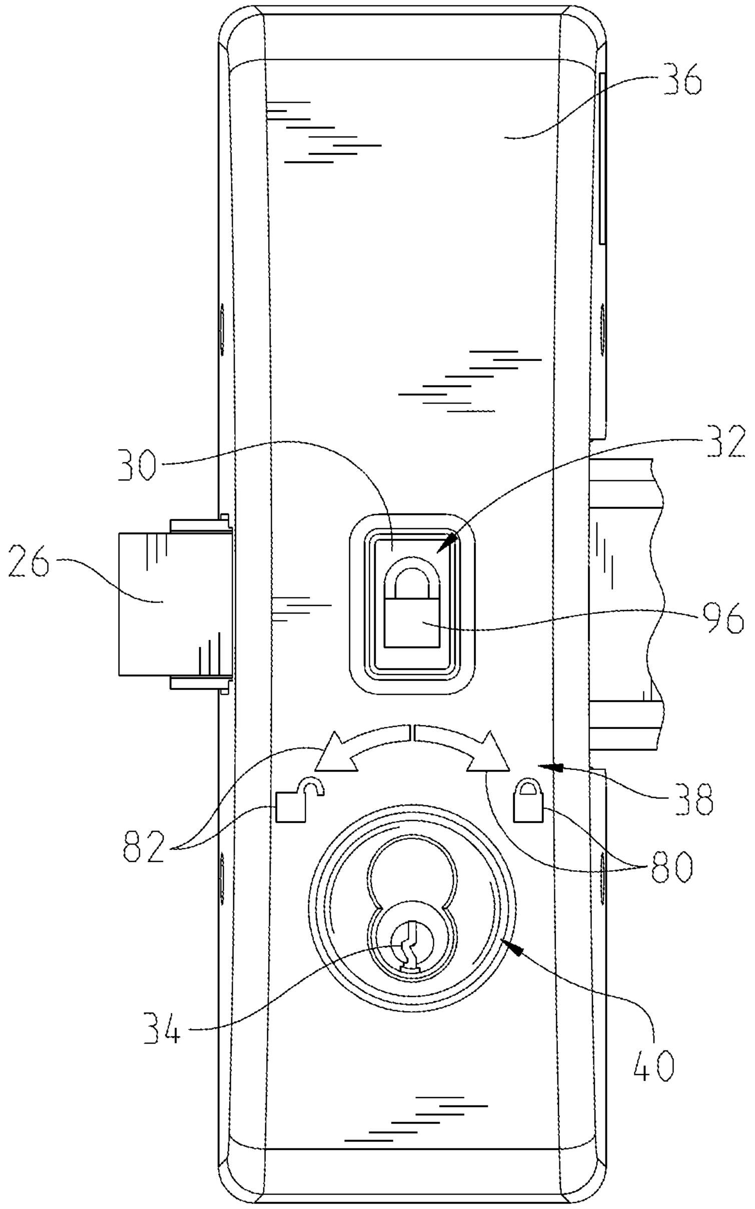
FIG. 1A is an alternative, partial front view of the locking device shown in FIG. 1.

Referring to FIG. 1A, locking device 20 includes visible indicator flag 30 visible through window 32. Visible indicator flag 30 forms a part of a visible indicator assembly operable to visibly indicate the locked or unlocked status of locking device 20. More particularly, visible indicator flag 30 signals whether locking device 20 maintains a locked position in which latch actuator 28 (FIG. 2) cannot be utilized to provide ingress through exit door 22. The indicator assembly of the present disclosure will be further described in the text that follows and is adaptable to a variety of locking devices including but not limited to the exit door lock shown herein. Window 32 provides protection to visible indicator flag 30, allowing visible indicator flag to be viewed, but not touched.

As described above, locking device 20 illustrated in the exemplary embodiments herein is useable for one-way locking of exit door 22. In the exemplary embodiments illustrated, such locking is effected by inserting a key into keyway 34 and rotating such key clockwise. Once these steps have been followed, locking device 20 will maintain a locked configuration in which latch actuator 28 is ineffective to actuate latch 26 to allow ingress through exit door 22. To unlock locking device 20, the key may again be positioned in keyway 34 and rotated counterclockwise to replace locking device 20 in an unlocked condition allowing latch actuator 28 to actuate latch 26 to allow ingress through door 22. To facilitate ease of operation, locking device 20 of the present disclosure features escutcheon 36 having operation indicator 38. Operation indicator 38 signals to an operator the input needed to effect locking or unlocking of locking device 20. In the exemplary embodiment shown, operation indicator 38 signals the rotation of a key properly inserted into keyway 34 needed to effect locking or unlocking of locking device 20.

Locking device 20 includes lock core 40 having an input in the form of keyway 34 (and an associated key) and an output in the form of tailpiece 42 (see, e.g., FIGS. 5, 7, 8, and 10-14. Tailpiece 42 is actuated by input 34 to effect locking and unlocking of locking device 20, as will be further described hereinbelow. Input 34 is exemplified herein as a keyway (and an associated key). "Input" and keyway will be interchangeably used in this document with respect to element 34, with "input" being the more general term. When the input takes the form of a keyway, input motion will be received by a combination of a key and keyway 34. In alternative forms of the disclosure, input 34 may, e.g., take the form of a knob, a handle, or a thumb turn. Generally, input 34 is a device allowing (in some embodiments selectively allowing) input rotation to be communicated to tailpiece 42 to produce rotation of tailpiece 42.

To effect movement of latch 26 to allow ingress through exit door 22, latch actuator 28 includes latch actuator output 44 as shown in FIG. 2. Latch actuator output 44 extends through baseplate 46 (FIG. 3) of locking device 20 to selectively actuate latch 26. More particularly, latch actuator output 44 is received into aperture 48 of baseplate 46 to enable movement of latch actuation mechanism 50 to effect movement of latch 46 into and out of locking position to prohibit ingress and egress through exit door 22. For the sake of brevity, latch actuation mechanism 50 will not be described in detail. Latch actuation mechanisms generally incorporate a physical input which effects movement of one or more components of the actuation mechanism to thereby effect actuation of the latch. With this in mind, locking of a latch actuator can be effected by precluding movement of an input to the mechanism, as is done in the exemplification illustrated herein.

Figure 3:
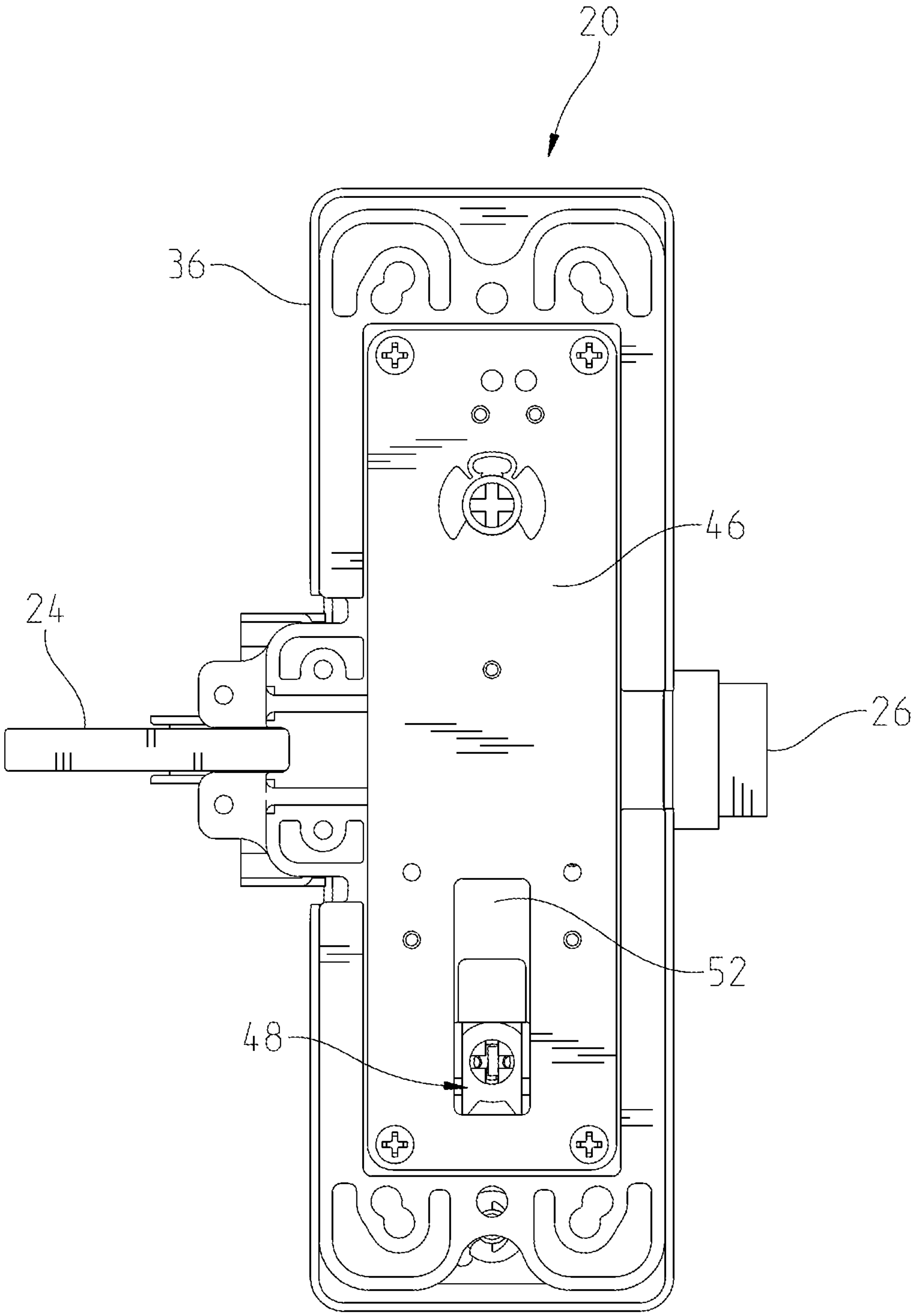
FIG. 3 is a rear view of the locking device of FIG. 1.
Figure 4:
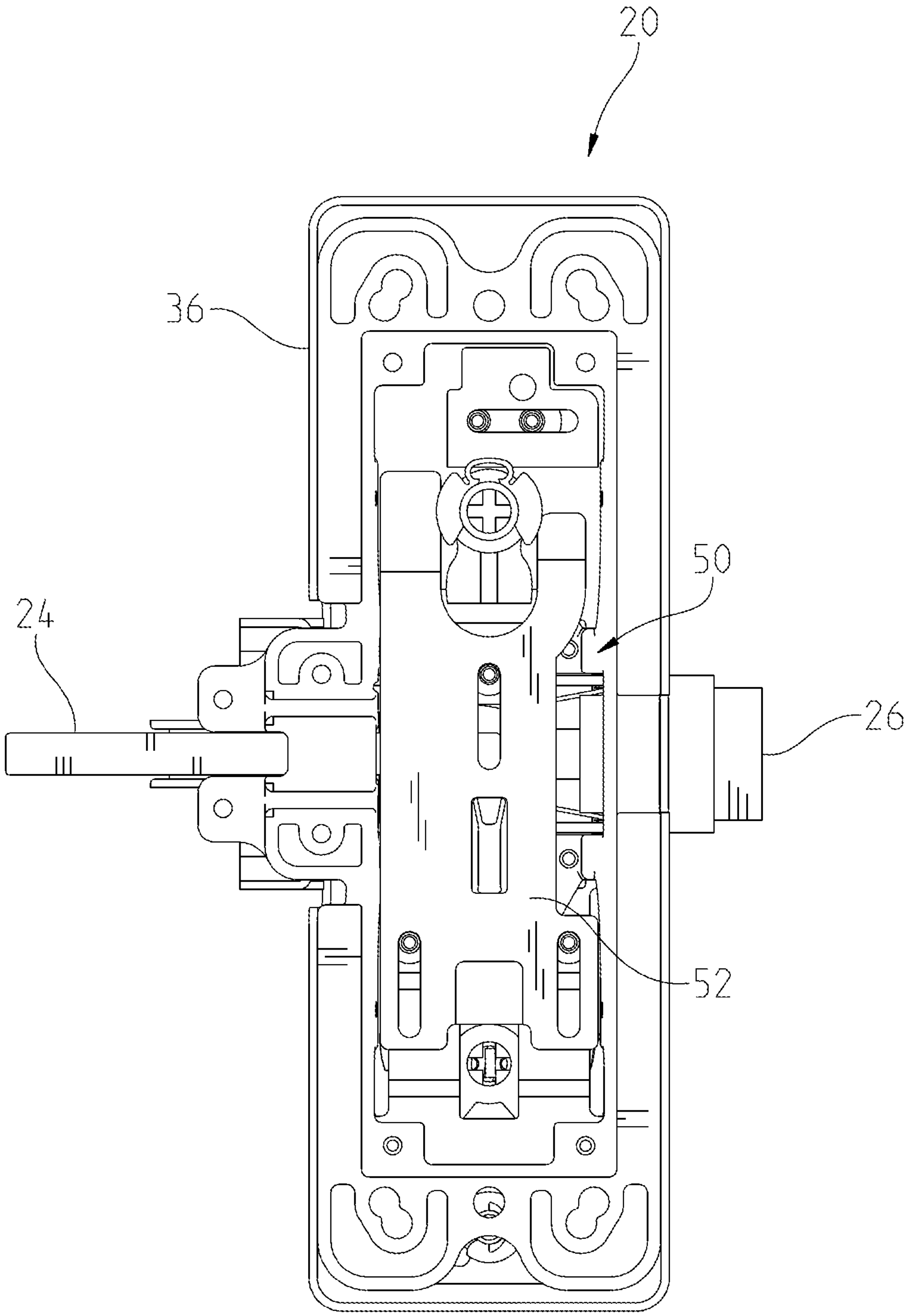
FIG. 4 is a partial, rear view of the locking device of FIG. 1.
Figure 5:
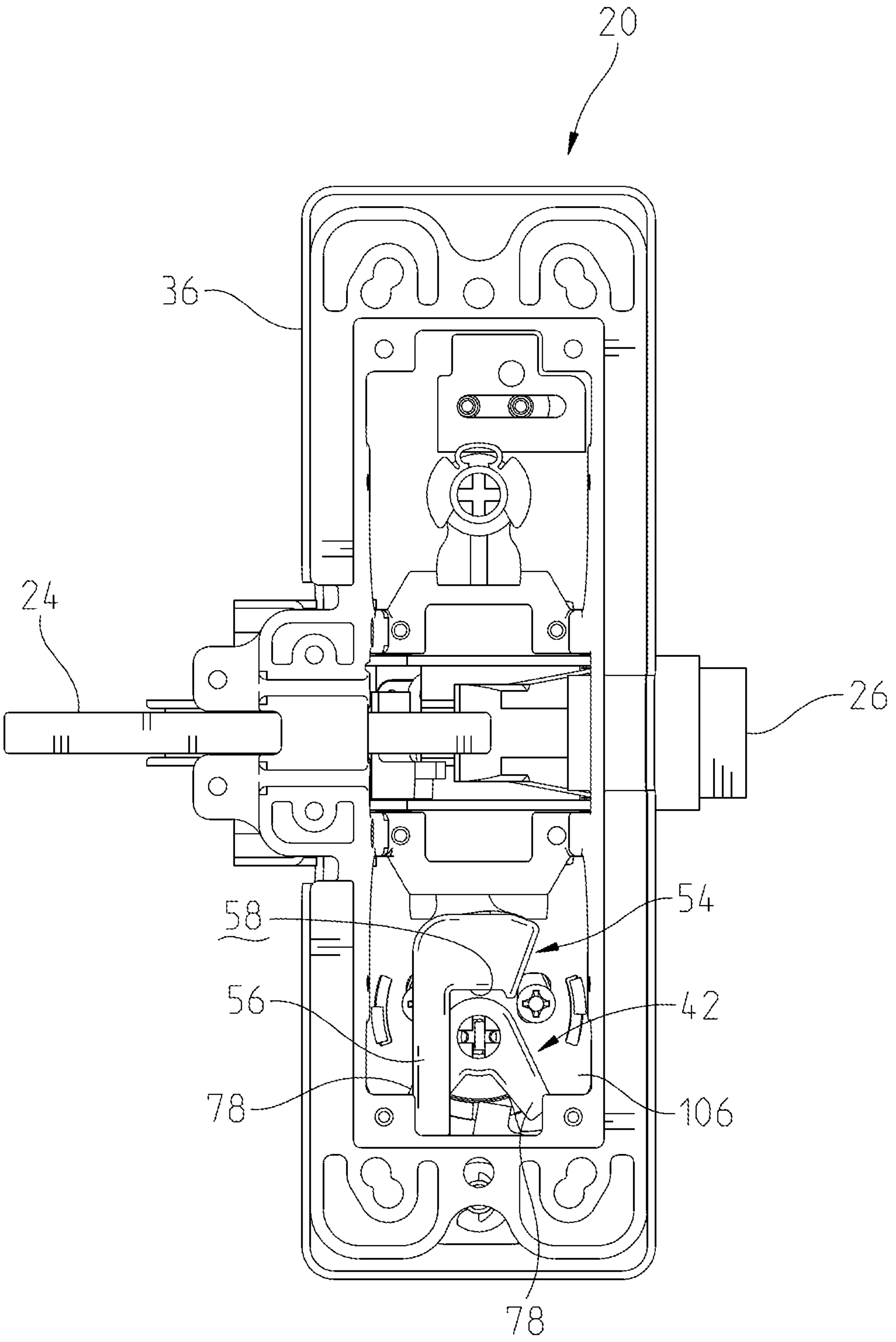
FIG. 5 is a partial, rear elevational view of the locking device of FIG. 1 showing a lock moveable between a locked position and an unlocked position, in the locked position the lock blocking actuation of a latch by a latch actuator, in the unlocked position the lock allowing actuation of the latch by the latch actuator.
Figure 6:
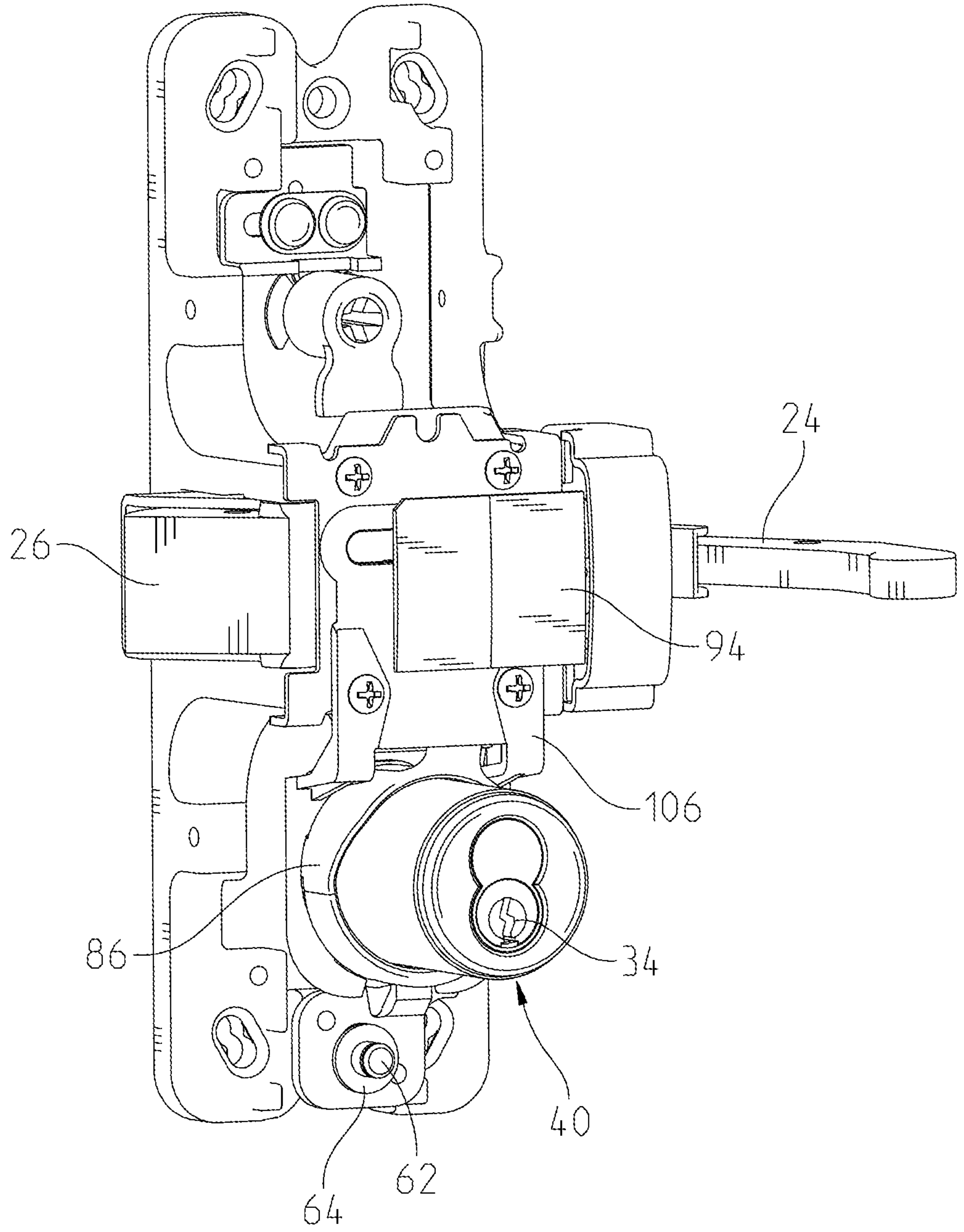
FIG. 6 is a front perspective view of the locking device of FIG. 1 with the escutcheon removed.
Figure 7:
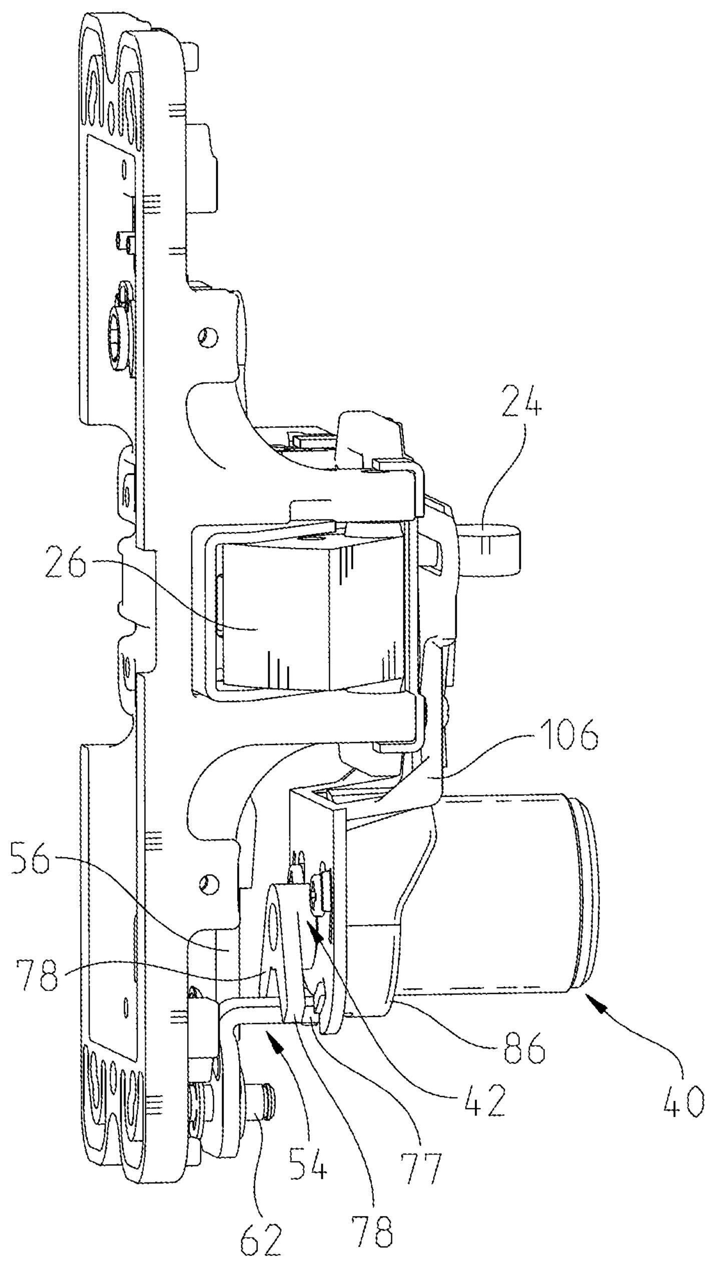
FIG. 7 is a side perspective view of the locking device components illustrated in FIG. 6.
Figure 8:
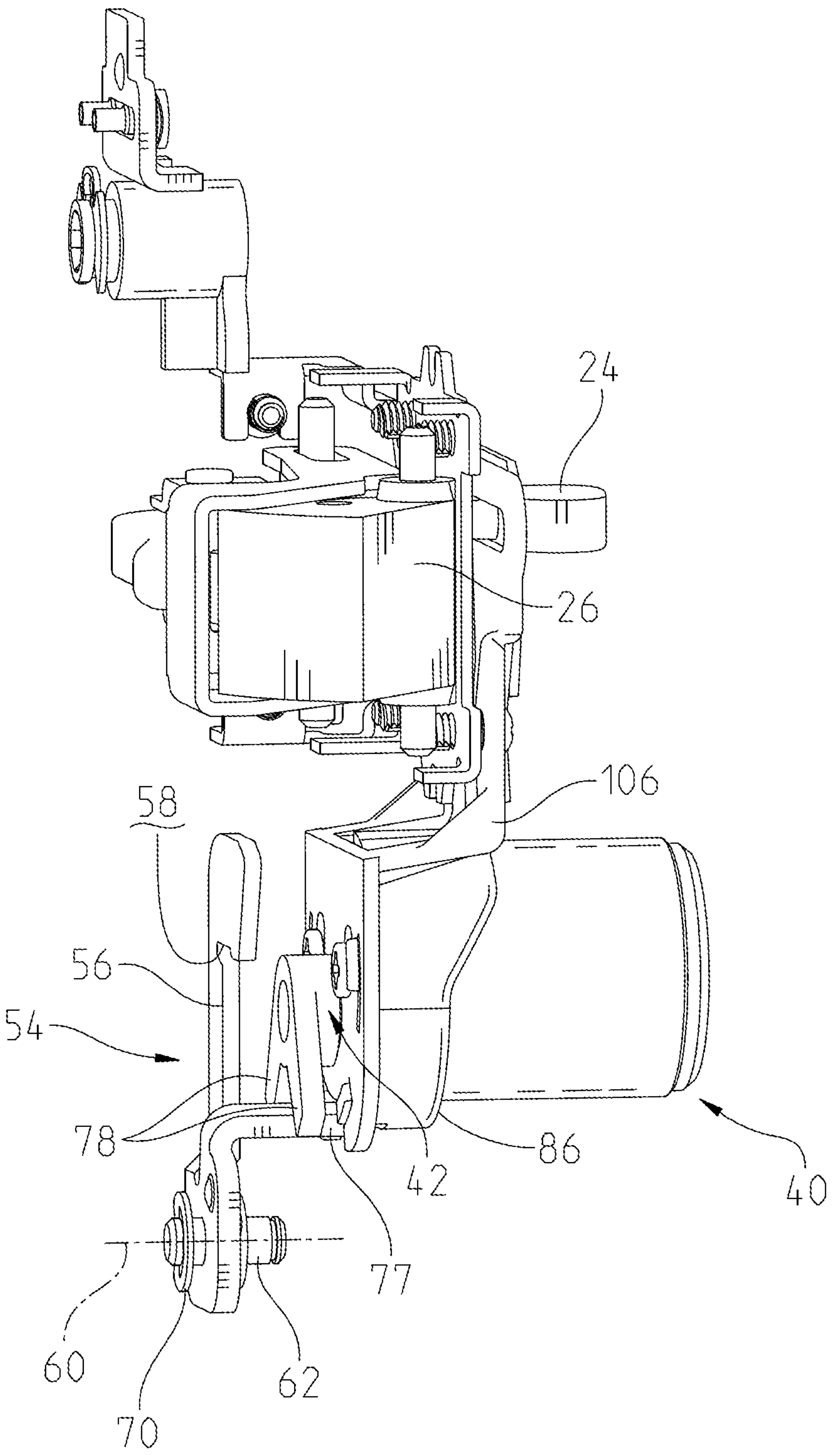
FIG. 8 is a partial, side perspective view showing the indicator assembly of the locking device of FIG. 1 in accordance with an embodiment of the present disclosure.

In the exemplification of the present disclosure illustrated, e.g., in FIGS. 3 and 4, latch actuator output 44 (FIG. 2) comprises a protrusion in the form of a rod having a substantially square cross-section received in aperture 48 (see, e.g., FIG. 3). Actuator output 44, in the form of a rod having a square cross-section may be moved vertically by latch actuator 28 (FIG. 2) to move sliding plate 52 of latch actuation mechanism 50 vertically which, through latch actuation mechanism 50, effects movement of latch 26 out of blocking engagement to allow opening of exit door 22. To effect locking of latch actuation mechanism 50 and preclude use of latch actuator 28 to actuator latch 26, lock 54 (FIGS. 5, 8, 11 and 13) can be positioned to present a physical barrier disallowing movement of latch actuator output 44 upward to translate sliding plate 52 and actuate latch actuation mechanism 50. Referring, e.g., to FIGS. 5-8, and 10-13, lock 54 includes locking arm 56 featuring barrier 58 operable to selectively resist upward movement of latch actuator output 44 to preclude latch actuator 28 from actuating latch 26.

Figure 9:
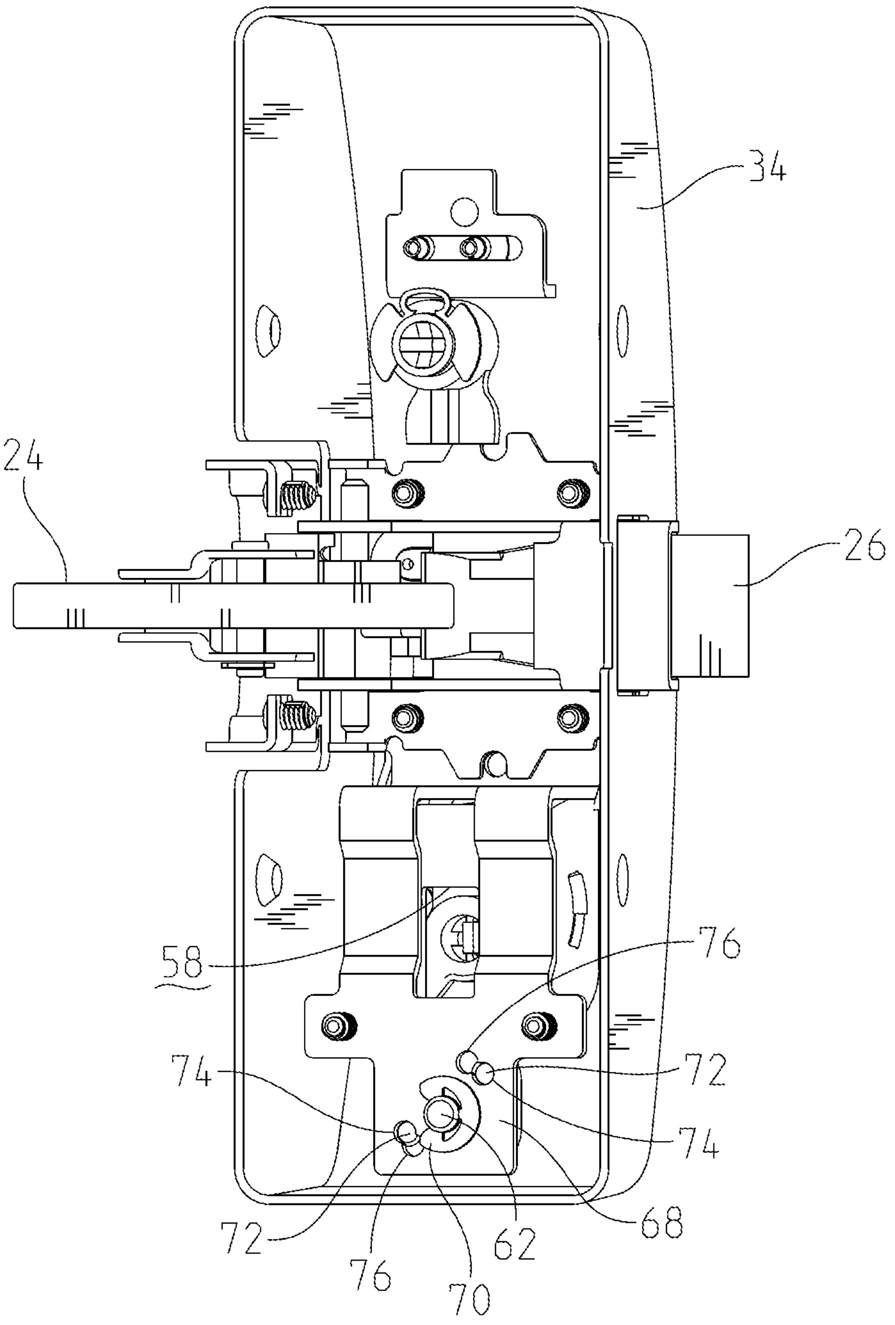
FIG. 9 is a partial, rear perspective of the locking device of FIG. 1.
Figure 10:
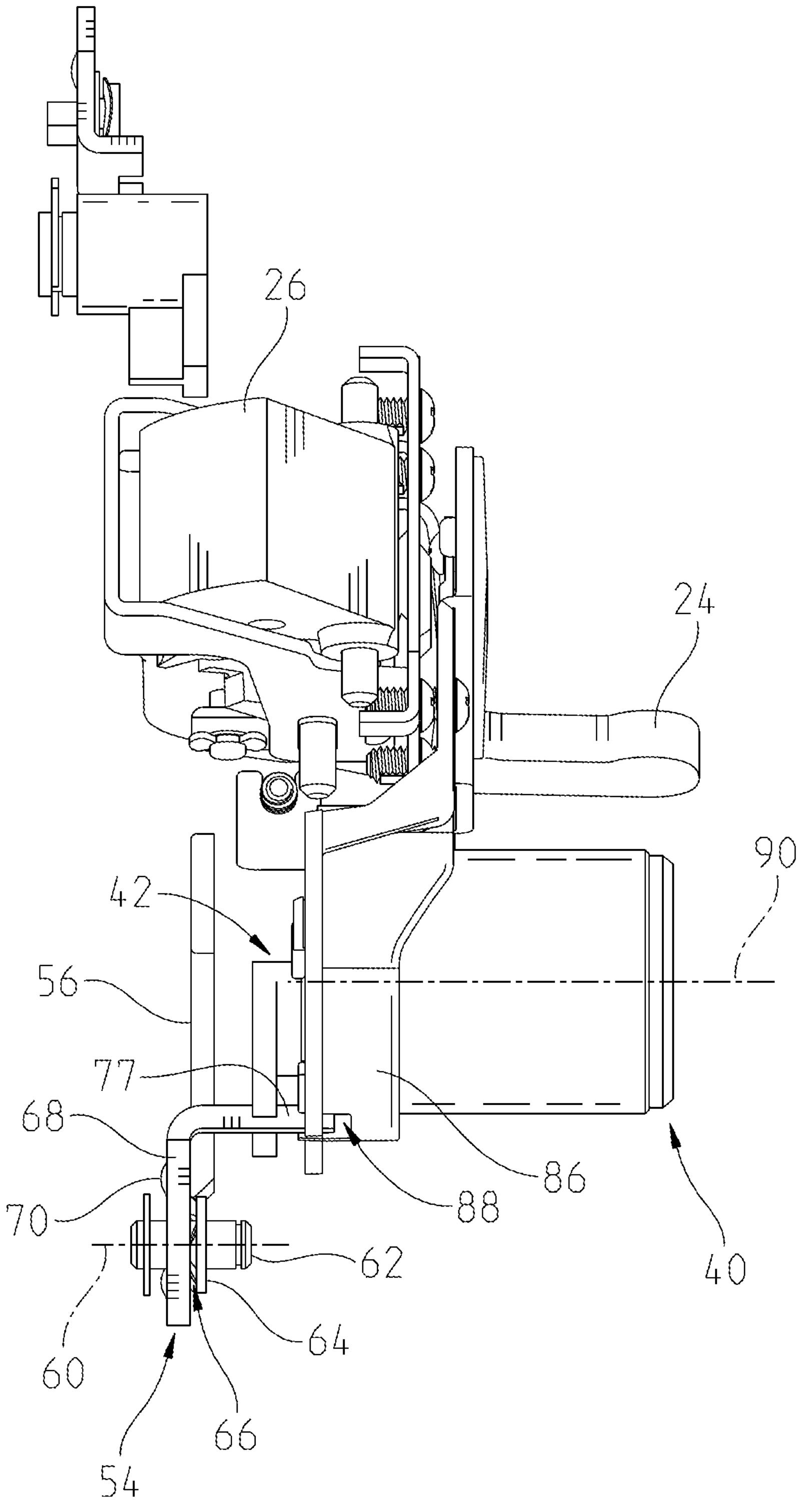
FIG. 10 is a partial, side perspective view illustrating, among other things, an indicator assembly in accordance with an embodiment of the present disclosure.
Figure 11:
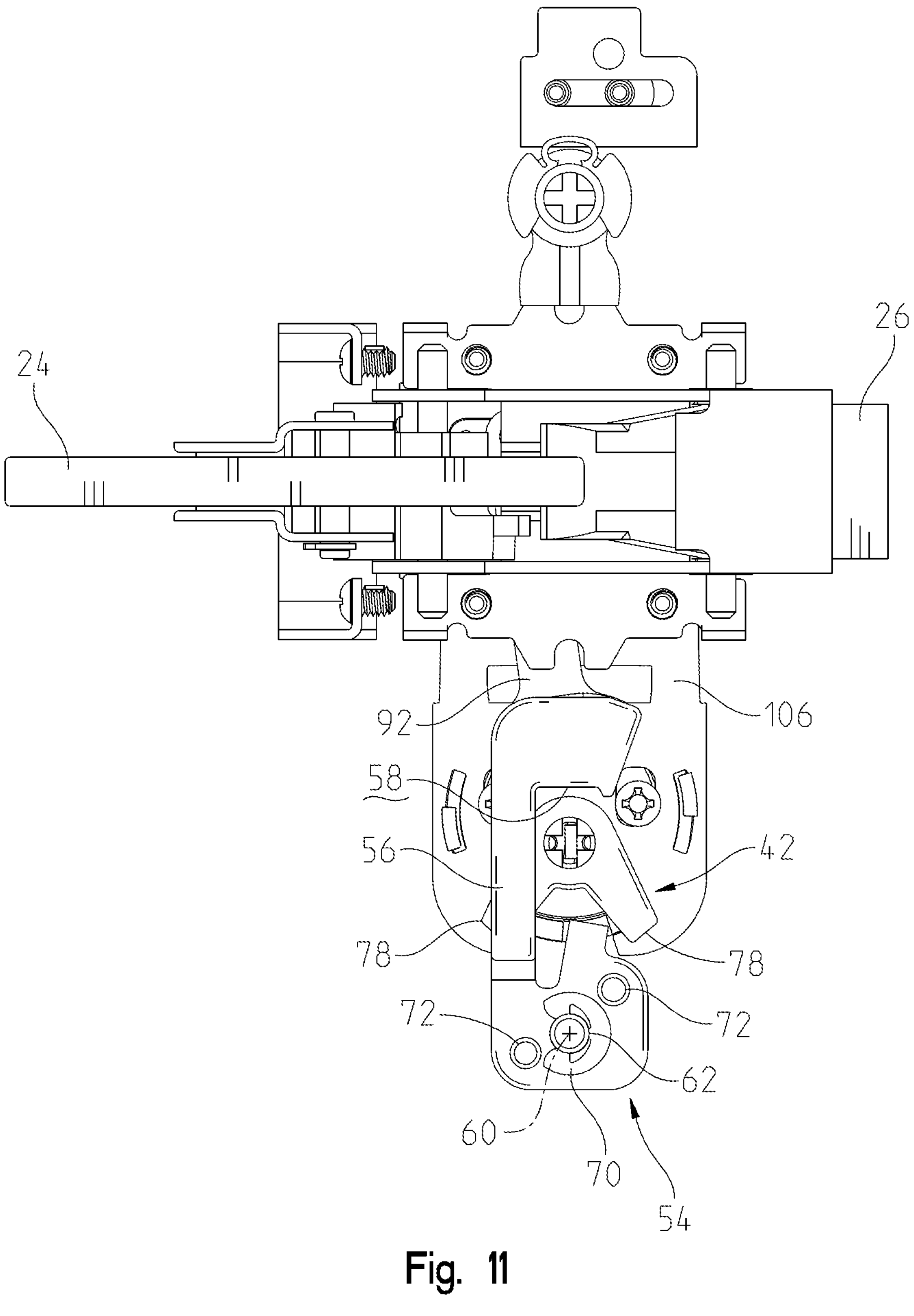
FIG. 11 is a partial, rear view of, among other things, the indicator assembly of FIG. 10.
Figure 12:
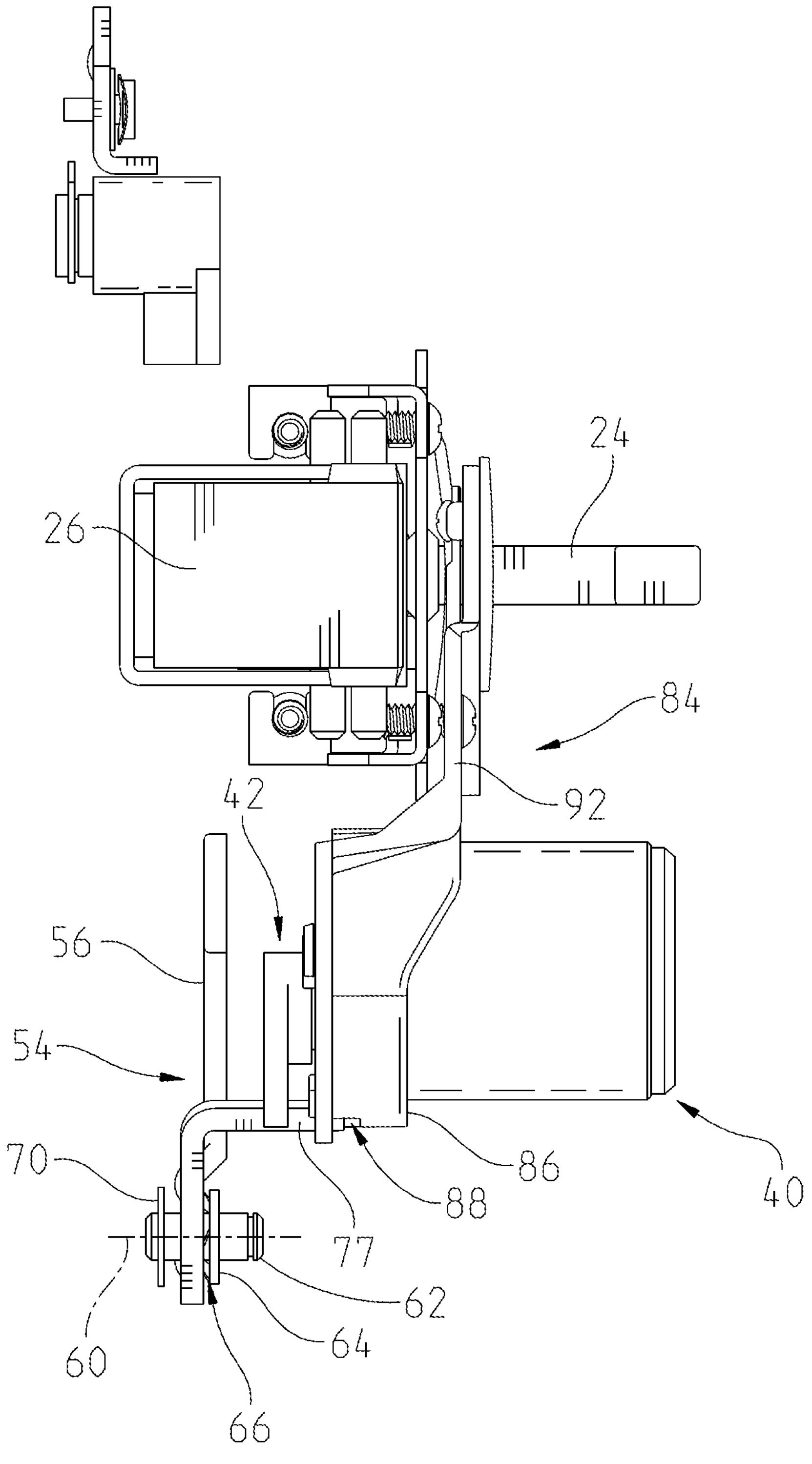
FIG. 12 is a partial, side elevational view of, among other things, the indicator assembly of FIG. 10.

Appendix 1 attached to and forming a part of U.S. provisional patent application Ser. No. 62/868,889 filed Jun. 29, 2019 provides additional details of an exemplification of the present disclosure. The entire content of Appendix 1 is hereby explicitly incorporated by reference herein. Page 3 of the Appendix 1 illustrates locking arm 56 in both the locked and unlocked conditions. To effect movement of lock 54 (and, consequently, locking arm 56 and barrier 58), lock 54 is pivotable about pivot axis 60 (FIG. 8) of pivot pin 62. Pivot pin 62 extends through a circular aperture through lock 54 sized just slightly larger than the circular exterior of pivot pin 62 to allow lock 54 to pivot about pivot pin 62. Pivot pin 62 includes flange 64 (FIG. 6) extending radially therefrom. Underneath flange 64 and intermediate flange 64 and lock 54 is wave spring 66 (FIG. 10). In construction, pivot pin 62 is passed through wave spring 66 and the circular aperture in lock 54. From this position, pivot pin 62 can further be passed through a circular aperture through support plate 68 (see, e.g., FIGS. 9 and 10). In this position, snap ring 70 is secured to an annular groove formed in the distal end of pivot pin 62 to secure lock 54 in operable position. Referring to FIGS. 9 and 11, lock 54 includes protrusion 72 cooperating with apertures 74 to form a lock detent positioned to retain lock 54 in the locked position. From this position, lock 54 can be rotated about pivot axis 60 of pivot pin 62 to the unlocked position. In the unlocked position, protrusions 72 occupy apertures 76 to define an unlocked detent positioned to retain lock 54 in the unlocked position. These detents index and hold lock 54 in the lock and unlock positions, respectively. As illustrated in the figures, pivot axis 60 is spaced from the axis of rotation of tailpiece 42.

To allow rotation received by input 34 of lock core 40 to move lock 54 between the locked and locked positions described above, actuation arm 77 of lock 54 is positioned intermediate a pair of tailpiece arms 78 of tailpiece 42. Rotation of input 34 of lock core 40 causes rotation of tailpiece 42 in a conventional manner. With actuation arm 77 positioned between the pair of spaced tailpiece arms 78, rotation of tailpiece 42 via input 34 in a first rotational direction causes a first one of the pair of spaced tailpiece arms 78 to actuate actuation arm 77 and thereby position lock 54 in the lock position. Similarly, rotation of the tailpiece of the lock core via the input of the lock core in a second rotational direction opposite the first rotational direction causes a second one of the pair of spaced tailpiece arms 78 to actuate actuation arm 77 and thereby position lock 54 in the unlocked position.

Referring back to FIGS. 1 and 1A, the first rotation direction referenced in the preceding paragraph is the clockwise direction while the second rotational direction is the counterclockwise direction. These directions are signaled by operation indicator 38. Operation indicator 38 signals to an operator a lock operator input direction for operating input 34 of lock core 40 to place lock 54 in the lock position and also signals to the operator an unlocked operator input direction for operating input 34 of lock core 40 to place lock 54 in the unlocked position. The particular embodiment of operation indicator 38 exemplified herein includes a debossed area including locked debossed area 80 and unlocked debossed area 82.

Escutcheon 36 is formed of sheet metal. In the process of forming Escutcheon 36, the sheet metal is deep drawn into the shape illustrated herein. After this process step, operation indicator 38 can be formed by stamping locked debossed area 80 and unlocked debossed area 82 into the front surface of the sheet metal. After stamping locked debossed area 80, locked debossed area 80 is filled with a red enamel paint. After stamping unlocked debossed area 82, unlocked debossed area 82 is filled with a green enamel paint. When the red enamel paint which visually indicates a locked condition and the green enamel paint which visually indicates an unlocked condition has dried, a clear coat is applied to the exterior of the escutcheon 36 and the dried paint. In one exemplary embodiment Micro Guard® AD1000 is utilized as the clearcoat. This clearcoat covalently bonds to the surface of Escutcheon 36 to provide a high level of protection and a high degree of wearability to operation indicator 38. Micro Guard® AD1000 is further described in the spec sheet relating to the same attached as Appendix 2 to and forming a part of U.S. provisional patent application Ser. No. 62/868,889 filed Jun. 29, 2019, the entire disclosure of Appendix 2 of U.S. provisional patent application Ser. No. 62/868,889 is hereby explicitly incorporated by reference herein.

While operation indicator 38 signals to an operator inputs needed to achieve the locked or unlocked state, visible indicator 84 selectively indicates the lock position of lock 54 and the unlock position of lock 54. Stated another way, operation indicator 38 shows the user how to lock and unlock locking device 20, while visible indicator 84 displays the current condition of locking device 20, i.e., locked or unlocked.

Referring to the figures, and particularly, FIGS. 6-15, visible indicator 84 includes cuff 86 positioned about an exterior of lock core 40. The exterior of lock core 40 will, in certain embodiments of the present disclosure, take the form of a shell housing an interchangeable lock core such as a small format interchangeable core (SFIC) as shown in the illustrations. Additional details of SFICs can be found in U.S. patent application Ser. No. 16/846,098, the entire disclosure of which is hereby explicitly incorporated by reference herein. Cuff 86 comprises a cylinder with a central opening therethrough. Cuff 86 is shaped and sized to fit about and rotate relative to the exterior surface of lock core 40. Referring, e.g., to FIG. 10, cuff 86 includes cutout 88 sized to accommodate actuation arm 77 positioned therein. As will be described in further detail below, actuation arm 77 is operable to effect displacement of visible indicator 84 and therefore is alternatively termed visible indicator actuator 77 throughout this document. As tailpiece 42 is rotated, visible indicator actuator 77 is rotated, as described above in connection with actuation of lock 54. Rotation of visible indicator actuator 77 causes rotation of cuff 86 about longitudinal axis 90 of lock core 40. As illustrated, extending from cuff 86, is indicator arm 92. In certain embodiments of the present disclosure, cuff 86 and indicator arm 92 comprise a single piece, as opposed to multiple discreet pieces joined one to the other. The single piece construct of cuff 86 and indicator arm may be described as "monolithic," or "integral." Monolithic and integral in this context are both used to denote a single, continuous material.

Figure 13:
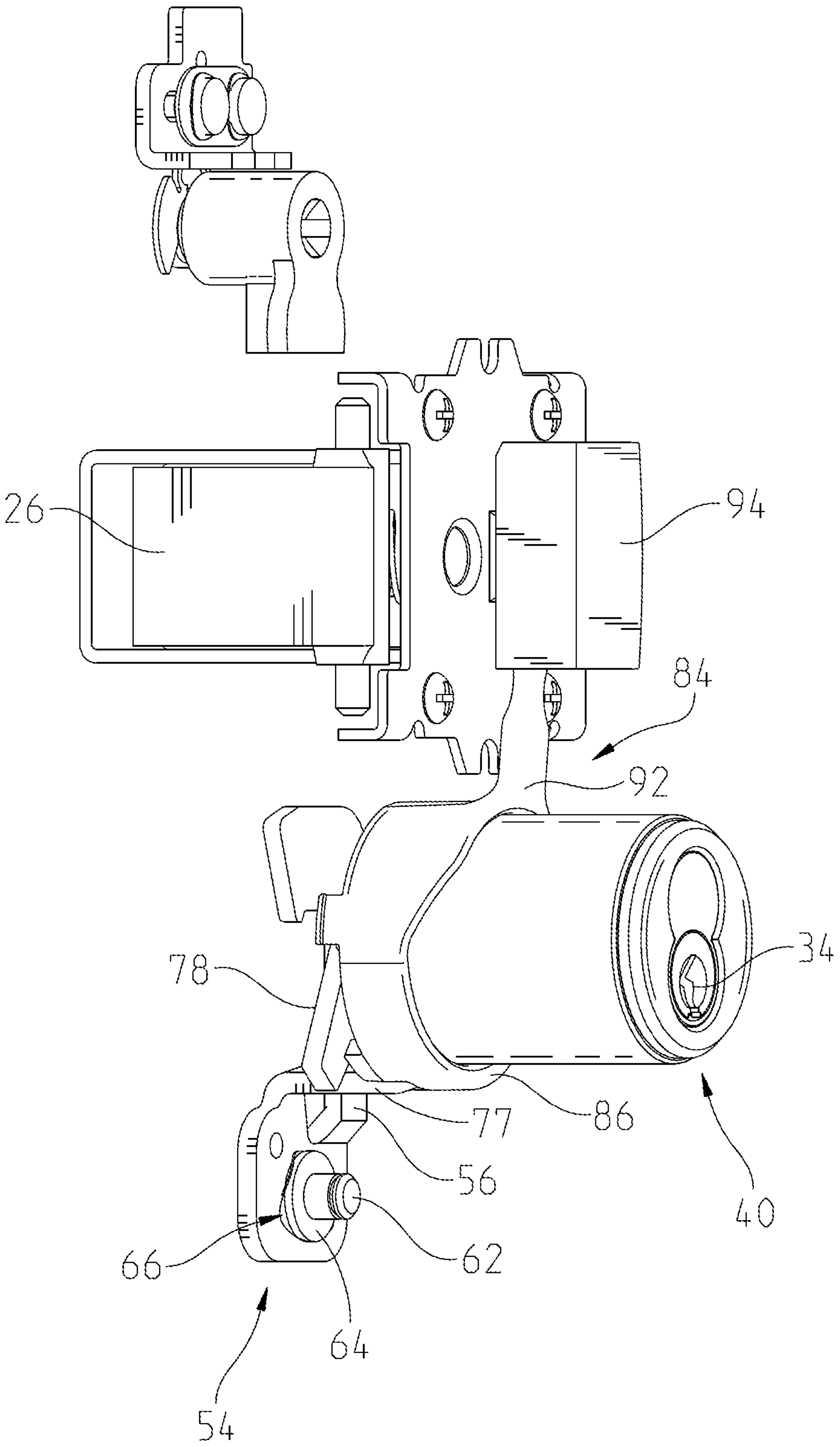
FIG. 13 is a partial, perspective view of, among other things, the indicator assembly of FIG. 10.
Figure 13A:
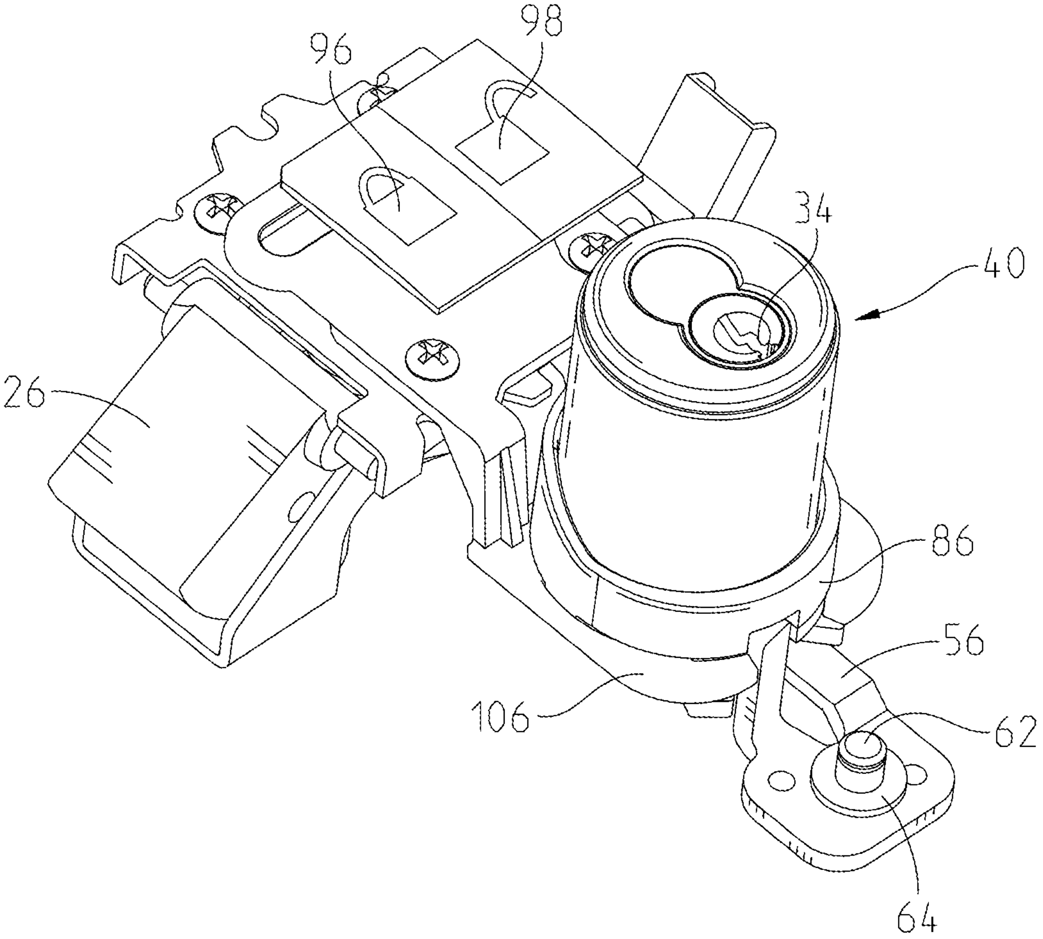
FIG. 13A is a partial, perspective view of, among other things, the indicator assembly of FIG. 10.
Figure 14:
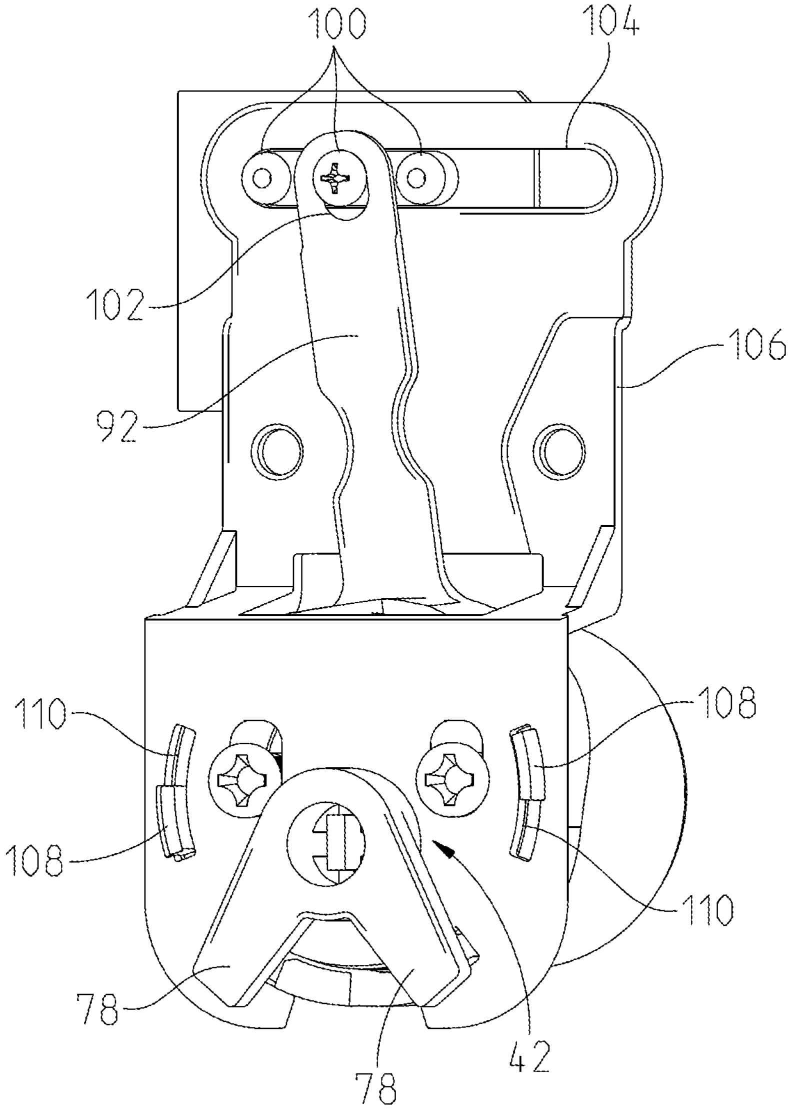
FIG. 14 is a rear perspective view of the indicator assembly shown with other elements of the blocking device of FIG. 10.
Figure 15:
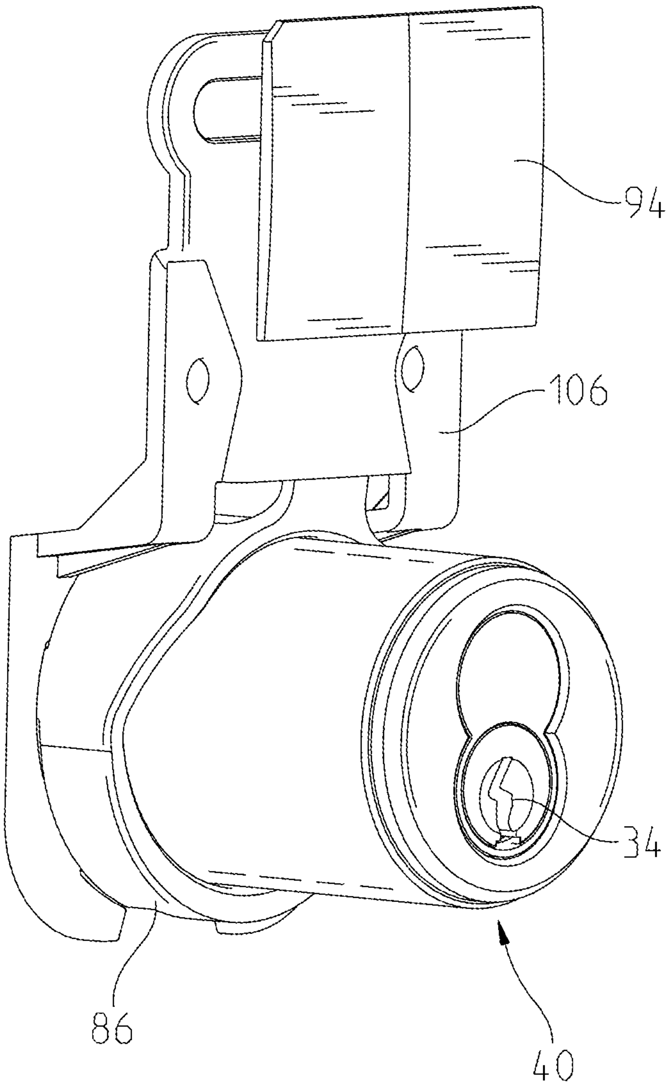
FIG. 15 is a front perspective view of the indicator assembly of FIG. 14.

In the exemplification illustrated, indicator arm 92 extends substantially (i.e., within usual tolerances) radially from the longitudinal axis of cuff 86, which coincides with longitudinal axis 90 (of lock core 4) when visible indicator 84 is operably assembled on lock core 40. In alternative forms of the present disclosure, indicator arm 92 may extend transversely from the longitudinal axis of cuff 86, but not radially (radially being a more narrow form of "transverse"). At the end of indicator arm 92 opposite cuff 86 is flag carrier 94. Flag carrier 94 features lock visible indicator 96 and unlock visible indicator 98 (FIG. 13A). As seen most clearly in FIG. 14, flag carrier 94 includes three bosses 100 extending rearwardly therefrom. A first of these bosses is positioned through slot 102 of indicator arm 92. All three bosses are positioned in slot 104 of visible indicator support plate 106 to form a guide guiding linear movement of flag carrier 94. As cuff 86 is rotated by tailpiece 42, rotary motion of indicator arm 92 is translated into linear motion of flag carrier 94 owing to the positioning of bosses 100 in slot 104. Importantly, visible indicator 94 is actuated by lock 54, thereby ensuring that an accurate representation of the locked or unlocked condition of locking device 20 is indicated. In the locked condition, lock visible indicator 96 is positioned under window 32 and is visible therethrough while unlock visible indicator 98 is obscured from view. Similarly, in the unlocked condition of locking device 20, unlocked visible indicator 98 is positioned beneath window 32 and is visible therethrough, while lock visible indicator 96 is obscured from view.

Motion of visible indicator 84 is guided by the positioning of cuff 86 about the exterior of lock core 40. Further, protrusions 108 ride in arcuate slots 110 of visible indicator support plate 106. Cooperation of protrusions 108 and accurate slots 110 further limits the extent of rotation of cuff 86 about lock core 40.

In the exemplification described herein, tailpiece 42 transmits rotary motion from input 34 of lock core 40 through tailpiece 42 to lock 54 (including actuation arm 77 thereof) in a motion transfer stream, tailpiece 42 being downstream from input 34 in the motion transfer stream and lock 54 being downstream from tailpiece 42 in the motion transfer stream. Importantly, the method of actuating visible indicator 84 comprises the step of actuating visible indicator 84 downstream from lock 54 in the motion transfer stream. In this way, movement in the motion transfer stream upstream of lock 54 is ineffective to actuate visible indicator 84 and therefore false flags cannot be given. Stated another way, if the lock was experiencing failure such as the transmission stream stopped short of lock 54, actuation of lock core 40 would not cause actuation of visible indicator 84, thereby avoiding a false flag.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A locking assembly, comprising:
- a latch;
- a latch actuator selectively actuatable by a user to actuate the latch;
- a lock core, comprising:
  - a cylindrical body including a longitudinal axis, a front face intersected by the longitudinal axis, and a rear face intersected by the longitudinal axis;
  - a tailpiece; and
  - an input positioned within the cylindrical body and operable to selectively actuate the tailpiece, the longitudinal axis of the lock core intersecting the tailpiece at a first end of the lock core and the longitudinal axis of the lock core intersecting the input at a second end of the lock core;
- a lock moveable between a lock position and an unlock position, the lock comprising a locking arm, in the lock position the locking arm blocking actuation of the latch by the latch actuator, in the unlock position the locking arm allowing actuation of the latch by the latch actuator, the tailpiece of the lock core positioned to actuate the lock between the lock position and the unlock position; and
- a visible indicator moveable between a first position visibly indicating the lock position of the lock and a second position visibly indicating the unlock position of the lock, the visible indicator positioned relative to the lock such that movement of the lock between the lock position and the unlock position translates into movement of the visible indicator between the first position and the second position, the tailpiece positioned intermediate the locking arm and the visible indicator along the longitudinal axis of the lock core, the visible indicator comprising a cuff portion positioned circumferentially about a radial exterior of the cylindrical body between the front face and the rear face, the cuff portion surrounding the radial exterior of the cylindrical body, wherein the lock is rotatable about a first axis and the visible indicator is rotatable about a second axis spaced apart from the first axis.

2. The locking assembly of claim 1, wherein the locking arm is pivotable about a pivot axis spaced from an axis of rotation of the tailpiece, the tailpiece of the lock core positioned to selectively pivot the locking arm between the lock position and the unlock position.

3. The locking assembly of claim 2, wherein the tailpiece of the lock core comprises a pair of spaced tailpiece arms extending transverse from the axis of rotation of the tailpiece, and wherein the lock comprises an actuation arm positioned between the pair of spaced tailpiece arms, whereby rotation of the tailpiece of the lock core via the input of the lock core in a first rotational direction causes a first one of the pair of spaced tailpiece arms to actuate the actuation arm and thereby position the lock in the lock position and rotation of the tailpiece of the lock core via the input of the lock core in a second rotational direction opposite the first rotational direction causes a second one of the pair of spaced tailpiece arms to actuate the actuation arm and thereby position the lock in the unlocked position.

4. The locking assembly of claim 1, wherein the visible indicator further comprises:
- an indicator arm extending from the cuff, and
- a flag carrier connected to the indicator arm and spaced from the cuff, the flag carrier having a lock visible indicator and an unlock visible indicator.

5. The locking assembly of claim 1, wherein the locking arm is pivotable about a pivot axis spaced from an axis of rotation of the tailpiece, the tailpiece of the lock core positioned to selectively pivot the locking arm between the lock position and the unlock position; and
- the visible indicator further comprises:
  - a flag carrier extending from the cuff, the flag carrier having a lock visible indicator and an unlock visible indicator;

the lock further comprising an actuation arm, the actuation arm positioned and sized to actuate the visible indicator between the first position and the second position when the locking arm is pivoted about the pivot axis, the tailpiece positioned intermediate the locking arm and the visible indicator along a longitudinal axis of the lock core, the longitudinal axis of the lock core intersecting the tailpiece at a first end of the lock core and the longitudinal axis of the lock core intersecting the input at a second end of the lock core, the actuation arm spanning the locking arm and the visible indicator.

6. The locking assembly of claim 1, further comprising:
an escutcheon having an operation indicator signaling to an operator a lock operator input direction for operating the input of the lock core to place the lock in the lock position and the operation indicator also signaling to the operator an unlock operator input direction for operating the input of the lock core to place the lock in the unlock position, the operation indicator comprising:
a debossed area, the debossed area comprising a lock debossed area and an unlock debossed area, the lock debossed area filled with a first colored fill visually indicating a lock condition, the unlock debossed area filled with a second colored fill visually indicating an unlock condition.

7. The locking assembly of claim 1, wherein the visible indicator is spaced from the tailpiece such that movement of the tailpiece without movement of the lock will not translate into movement of the visible indicator.

8. A locking assembly, comprising:
a latch;
a latch actuator selectively actuatable by a user to actuate the latch;
a lock core, comprising:
a cylindrical body including a longitudinal axis, a front face intersected by the longitudinal axis, and a rear face intersected by the longitudinal axis;
a tailpiece; and
an input positioned within the cylindrical body and operable to selectively actuate the tailpiece, the longitudinal axis of the lock core intersecting the tailpiece at a first end of the lock core and the longitudinal axis of the lock core intersecting the input at a second end of the lock core;
a lock moveable between a lock position and an unlock position, in the lock position the lock blocking actuation of the latch by the latch actuator, in the unlock position the lock allowing actuation of the latch by the latch actuator, the tailpiece of the lock core positioned to actuate the lock between the lock position and the unlock position; and
a visible indicator moveable between a first position visibly indicating the lock position of the lock and a second position visibly indicating the unlock position of the lock, the visible indicator positioned relative to the lock such that movement of the lock between the lock position and the unlock position translates into movement of the visible indicator between the first position and the second position, the visible indicator positioned along the longitudinal axis of the lock core between the tailpiece and the input, the visible indicator comprising a cuff portion positioned circumferentially about a radial exterior of the cylindrical body between the front face and the rear face, the cuff portion surrounding the radial exterior of the cylindrical body, wherein the lock is rotatable about a first axis and the visible indicator is rotatable about a second axis spaced apart from the first axis.

9. The locking assembly of claim 8, wherein the visible indicator further comprises:
a flag carrier extending from the cuff, the flag carrier having a lock visible indicator and an unlock visible indicator.

10. The locking assembly of claim 8, wherein the visible indicator further comprises:
an indicator arm extending from the cuff; and
a flag carrier connected to the indicator arm and spaced from the cuff, the flag carrier having a lock visible indicator and an unlock visible indicator.

11. The locking assembly of claim 8, wherein the lock comprises:
a locking arm pivotable about a pivot axis spaced from an axis of rotation of the tailpiece, the tailpiece of the lock core positioned to selectively pivot the locking arm between the lock position and the unlock position; and
the visible indicator comprises:
a flag carrier extending from the cuff, the flag carrier having a lock visible indicator and an unlock visible indicator;
the lock further comprising an actuation arm, the actuation arm positioned and sized to actuate the visible indicator between the first position and the second position when the locking arm is pivoted about the pivot axis, the tailpiece positioned intermediate the locking arm and the visible indicator along a longitudinal axis of the lock core, the longitudinal axis of the lock core intersecting the tailpiece at a first end of the lock core and the longitudinal axis of the lock core intersecting the input at a second end of the lock core, the actuation arm spanning the locking arm and the visible indicator.

12. The locking assembly of claim 8, further comprising:
an escutcheon having an operation indicator signaling to an operator a lock operator input direction for operating the input of the lock core to place the lock in the lock position and the operation indicator also signaling to the operator an unlock operator input direction for operating the input of the lock core to place the lock in the unlock position, the operation indicator comprising:
a debossed area, the debossed area comprising a lock debossed area and an unlock debossed area, the lock debossed area filled with a first colored fill visually indicating a lock condition, the unlock debossed area filled with a second colored fill visually indicating an unlock condition.

13. The locking assembly of claim 8, wherein the tailpiece is positioned intermediate the locking arm and the visible indicator along the longitudinal axis of the lock core.

14. The locking assembly of claim 8, wherein the visible indicator is spaced from the tailpiece such that movement of the tailpiece without movement of the lock will not translate into movement of the visible indicator.

* * * * *